June 21, 1938. S. H. SLOBODKIN 2,121,165
MIXING BOWL
Filed March 10, 1936
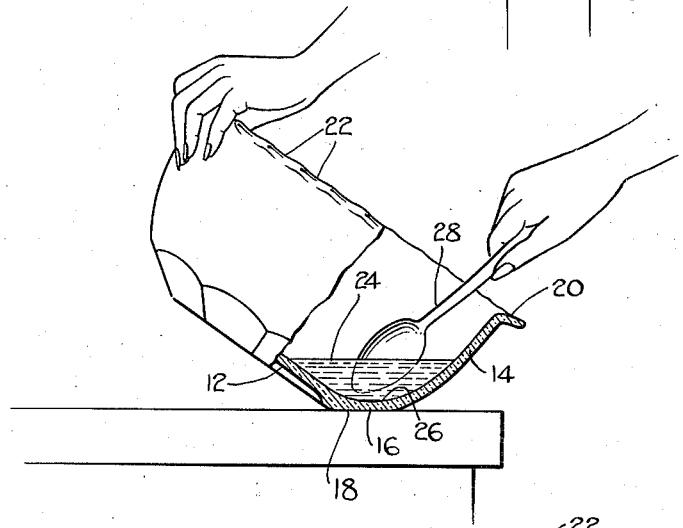
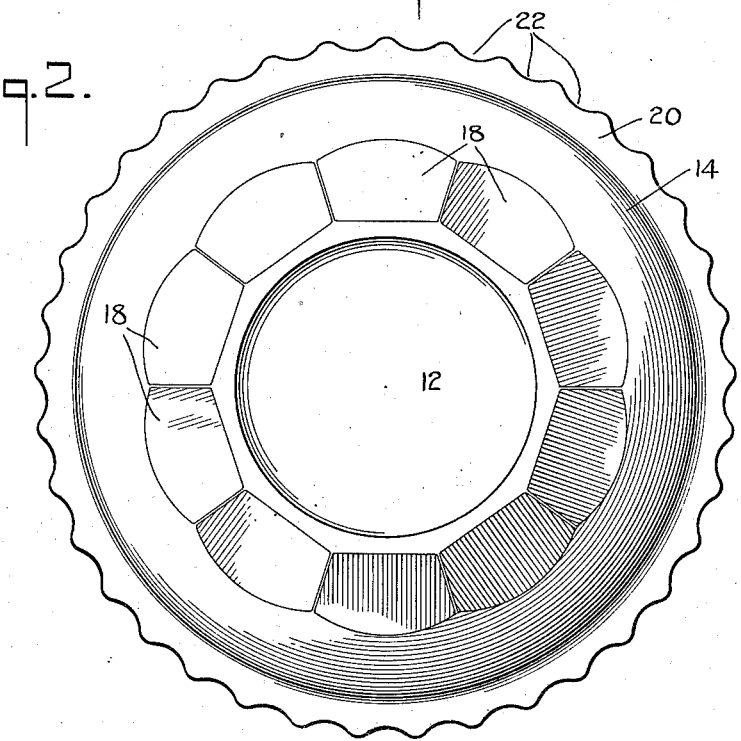
INVENTOR
Simon H. Slobodkin
BY
ATTORNEYS Patented June 21, 1938

2,121,165

UNITED STATES PATENT OFFICE 2,121,165

MIXING BOWL

Simon H. Slobodkin, New Rochelle, N. Y.

Application March 10, 1936, Serial No. 68,011

5 Claims. (Cl. 65—15)

This invention relates to mixing bowls, particularly to such bowls intended for ordinary household use.

The primary object of the invention is to generally improve mixing bowls with a view to efficient and convenient use with a minimum expenditure of effort.

It is customary to tilt a mixing bowl on its lower edge when mixing or beating batter therein. To support the bowl in this position is rapidly fatiguing, because of the tendency of the bowl to oscillate and move,—a tendency caused by the very act of mixing or beating the material in the bowl. One important object of my invention is to overcome this difficulty, and to this end I provide the lower edge or corner of the bowl with a flat angularly disposed facet on which the bowl may be solidly rested. More preferably, I provide a series of such facets extending entirely around the lower periphery of the bowl. However, the inside surface of the bowl is left smooth and rounded as though no facets were provided on the exterior, the facets being formed by differences in the thickness of the wall of the bowl.

The bowl is ordinarily held by gripping its top edge with one hand during the mixing operation. This edge has heretofore been made smooth, and there is a tendency for one's hand to slip on the edge, in consequence of which it is necessary to grip the edge tightly, which in turn is rapidly tiring. In accordance with a further feature and object of my invention, the edge of the bowl is provided with a series of indentations or finger holds. These may be obtained by reversely scalloping the edge, thereby improving rather than marring the appearance of the bowl. The edge of the bowl is preferably flanged outwardly, and it is this outwardly directed flange that is indented. The resulting construction is particularly easy to hold, especially when combined with the aforesaid angular facets.

It is sometimes necessary to mix a small quantity of material, but this cannot be done conveniently with mixing bowls of conventional shallow design. My improved mixing bowl retains the general characteristics of being dished and open-topped, but the bowl is provided with a relatively flat bottom wall and a relatively deep side wall, so that the material being mixed tends to settle into the corner of the bowl with sufficient depth for efficient beating. At the same time the corner is itself broadly rounded to easily receive any ordinary beating spoon, and the curve is preferably made tangential to a plane parallel to the exterior facet. The middle of the curve is thus brought to a horizontal position when the bowl is rested on one of the facets.

To the accomplishment of the foregoing and such other objects as will hereinafter appear, my invention consists in the mixing bowl elements and their relation one to the other, as are hereinafter more particularly described in the specification and sought to be defined in the claims. The specification is accompanied by a drawing, in which:

Fig. 1 is a partially sectioned view showing the improved bowl in use; and

Fig. 2 is an inverted plan view thereof.

Referring to the drawing, the bowl comprises a bottom wall 12 and a side wall 14. The lower peripheral portion of the bowl 16, that is, the portion connecting the bottom and side walls, is provided with one, or more preferably a continuous series of, flat angularly related facets 18. It will be evident from inspection of the drawing that the bowl may be tipped and solidly rested on any one of the facets 18. The angular position is maintained relatively stably, particularly in contrast with conventional bowls in which the edge in question is rounded so that the bowl rests with only single point contact.

The bowl is preferably made of pottery ware or ceramic material molded to the desired shape, and the inner wall may be and preferably is made smooth and continuous. In other words, the facets 18 do not in any way manifest themselves on the interior of the bowl and are instead formed by appropriate changes in thickness of the wall or molded material.

The upper edge of the bowl is preferably flanged outwardly, as is indicated at 20, and the resulting flange is provided with recesses or finger holds 22. A continuous series of these recesses may be formed entirely about the periphery of the bowl, and one shape of recess is clearly illustrated in the drawing, this being a reversed or indented scallop. It will be apparent from inspection of Fig. 1, that when using the bowl the hand supporting the same grips the elevated edge of the bowl, the desired hold being readily maintained without fatigue because of the substantial outward projection of the flange 20 and the indentations 22 which receive the fingers. In fact, the scalloped edge is of great assistance in holding the bowl no matter how the edge is gripped.

It will be noted on reference to Fig. 1, that my improved mixing bowl is rather deep and straight in configuration compared to the acute angle and flared sides of the ordinary mixing bowl. In other words, the bottom wall 12 is relatively straight and the side wall 14 is high and nearly though not quite upright. Because of this construction, the mixture being beaten readily settles in a corner of the bowl, as is indicated at 24, even when only a small quantity is being handled. The resulting depth of material facilitates mixing or beating the same.

I do not mean to suggest the formation of an actual corner, for instead the bottom and side walls are connected by a smooth continuously curved surface 26, and the curvature of this surface is made such as to readily receive any ordinary mixing spoon, such as the spoon 28. I may also point out that the curved surface 26 is preferably made tangential to a horizontal plane as viewed in Fig. 1, that is, to a plane extending parallel to the adjacent exterior facet 18.

It is believed that the mode of constructing and using my improved mixing bowl, as well as the many advantages thereof, will be apparent from the foregoing detailed description. It will also be apparent that while I have shown and described my invention in a preferred form, many changes and modifications may be made in the structure disclosed, without departing from the spirit of the invention defined in the following claims.

I claim:

1. A mixing bowl comprising a bottom wall and a side wall, the lower peripheral edge of the bowl at the junction of the bottom and side walls being provided with a plurality of flat angularly related facets of substantial area extending about said lower periphery, the inside of the bowl at said junction being smoothly curved and continuous, the upper edge of the side wall being flanged outwardly and indented with a continuous series of recesses or scallops, said facets and scallops serving to facilitate holding the bowl stably at an angle when mixing the contents thereof.

2. A mixing bowl molded of ceramic material, and comprising a bottom wall and a side wall, the lower peripheral edge of the bowl at the junction of the bottom and side walls being provided on its exterior with a continuous series of flat angularly related facets of substantial area, the inside of the bowl being smoothly curved and continuous at said junction, the upper edge of the side wall being flanged outwardly and indented with a continuous series of recesses or scallops, said facets and scallops serving to facilitate holding the bowl stably at an angle when mixing the contents thereof.

3. A mixing bowl comprising a relatively flat bottom wall and a deep side wall, the lower peripheral edge of the bowl at the junction of the bottom and side walls being provided on its exterior with a continuous series of flat angularly related facets of substantial area, the inside of the bowl being smooth and continuous and curved at the junction of the bottom and side walls, the upper edge of the side wall being flanged outwardly and indented with a continuous series of recesses.

4. A dished open-topped relatively thick-walled mixing bowl having bottom and side walls and a plurality of flat angularly disposed facets extending about the lower periphery at the junction of said bottom and side walls, whereby said bowl may be held relatively stably on one of said facets when mixing or beating the contents thereof, the inner wall of said bowl being smoothly curved and continuous and the flat facets being formed by differences in the thickness of the wall of the bowl.

5. A dished open-topped relatively thick-walled mixing bowl made of ceramic material, and comprising a bottom wall and a side wall, the lower periphery of the bowl at the junction of the bottom and side walls being provided on its exterior with a plurality of flat, angularly related facets, the inside of the bowl being smoothly curved and continuous, the flat facets being formed by differences in the thickness of the wall of the bowl, the upper periphery of the bowl being indented with a series of concave recesses or finger notches dimensioned to comfortably receive the fingers of the user, said facets and said recesses serving to facilitate holding the bowl stably when mixing or beating the contents thereof.

SIMON H. SLOBODKIN.